US011157227B2

(12) United States Patent
Ren et al.

(10) Patent No.: US 11,157,227 B2
(45) Date of Patent: Oct. 26, 2021

(54) SWITCHING CONTROL DEVICE AND CONTROL METHOD THEREOF, AND DISPLAY DEVICE

(71) Applicants: Ordos Yuansheng Optoelectronics Co., Ltd., Inner Mongolia (CN); BOE Technology Group Co., Ltd., Beijing (CN)

(72) Inventors: Yanfei Ren, Beijing (CN); Jigang Sun, Beijing (CN); Wanhua Yang, Beijing (CN); Weixing Shan, Beijing (CN); Shaolei Zong, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/641,298

(22) PCT Filed: Mar. 18, 2019

(86) PCT No.: PCT/CN2019/078566
§ 371 (c)(1),
(2) Date: Feb. 24, 2020

(87) PCT Pub. No.: WO2019/184755
PCT Pub. Date: Oct. 3, 2019

(65) Prior Publication Data
US 2020/0379704 A1 Dec. 3, 2020

(30) Foreign Application Priority Data
Mar. 30, 2018 (CN) .......................... 201810292204.5

(51) Int. Cl.
*G06F 3/14* (2006.01)
*G06F 3/041* (2006.01)
(Continued)

(52) U.S. Cl.
CPC .......... *G06F 3/1431* (2013.01); *G06F 3/0412* (2013.01); *G06F 3/1446* (2013.01);
(Continued)

(58) Field of Classification Search
CPC .... G06F 3/0412; G06F 3/1431; G06F 3/1446; G09G 3/3225; G09G 3/3648
See application file for complete search history.

(56) References Cited

U.S. PATENT DOCUMENTS

2004/0183745 A1  9/2004 Choi
2007/0188404 A1* 8/2007 Cha ....................... G06F 1/1616
                                                                345/1.1
(Continued)

FOREIGN PATENT DOCUMENTS

CN         101192399 A      6/2008
CN         201681587 U     12/2010
(Continued)

OTHER PUBLICATIONS

Chinese Office Action in corresponding application No. 201810292204.5 dated Jul. 17, 2019.
(Continued)

*Primary Examiner* — Alexander Eisen
*Assistant Examiner* — Cory A Almeida
(74) *Attorney, Agent, or Firm* — Arent Fox LLP; Michael Fainberg

(57) ABSTRACT

A switching control device, a control method, and a display device are provided. The switching control device includes: a main control circuit and switch control circuits in one-to-one correspondence with display screens. The main control
(Continued)

circuit is configured to output a display control voltage, and output in a time-division manner a display switching instruction in one-to-one correspondence with each of the display screens. For each of the display screens, the display switching instruction includes: a switch control signal, a data signal, a lighting signal, and an extinguishing signal. The main control circuit is configured to output a lighting signal to the corresponding display screens, and to output an extinguishing signal to the corresponding display screens. The switch control circuits are configured to receive a display control voltage and a switch control signal, and supply a display control voltage to the corresponding display screens.

18 Claims, 3 Drawing Sheets

(51) Int. Cl.
  *G09G 3/3225* (2016.01)
  *G09G 3/36* (2006.01)
(52) U.S. Cl.
  CPC ......... *G09G 3/3225* (2013.01); *G09G 3/3648* (2013.01); *G09G 2330/021* (2013.01)

(56) References Cited

U.S. PATENT DOCUMENTS

2009/0027306 A1* 1/2009 Kawabe .............. H04W 52/027
  345/3.1
2018/0226037 A1 8/2018 Zhang et al.

FOREIGN PATENT DOCUMENTS

| CN | 105653226 A | 6/2016 |
| CN | 105931610 A | 9/2016 |
| CN | 106023923 A | 10/2016 |
| CN | 106027793 A | 10/2016 |
| CN | 107562261 A | 1/2018 |
| CN | 108492796 A | 9/2018 |
| JP | 2002232852 A | 8/2002 |

OTHER PUBLICATIONS

Chinese Office Action in corresponding application No. 201810292204.5 dated Aug. 13, 2019.
Decision of Rejection for corresponding application No. 201810292204.5 dated Nov. 11, 2019.

* cited by examiner

SWITCHING CONTROL DEVICE AND CONTROL METHOD THEREOF, AND DISPLAY DEVICE

This application is a US National Stage of International Application No. PCT/CN2019/078566, filed Mar. 18, 2019, which claims the priority to the Chinese Patent Application No. 201810292204.5, titled "Switching Control Device and Display Device", filed with the Chinese Patent Office on Mar. 30, 2018, which is incorporated in this application by reference.

FIELD

The present disclosure relates to the field of circuit control and in particular to a switching control device, a control method thereof and a display device.

BACKGROUND

With the development of information technology, people's demand on a display device is higher and higher, the display device is not only required to have higher resolution ratio and screen-to-body ratio, but also is required to realize double-sided display.

At present, a display device with a double-sided display function has a lower resolution ratio or higher power consumption, namely multi-screen display with low power consumption under the condition that the resolution ratio of display is not reduced cannot be realized in the related art.

SUMMARY

The embodiments of the present disclosure provide a switching control device. The device includes a master control circuit; and a plurality of switch control circuits corresponding to a plurality of display screens one by one.

The master control circuit is configured to output a display control voltage, and output, in a time-sharing manner, a plurality of display switching instructions corresponding to the plurality of display screens one by one.

For each of the plurality of display screens, the plurality of display switching instructions include at least one of a switch control signal configured to control the switch control circuit corresponding to the display screen, a data signal configured to control display frames of the display screen, a switching-on signal configured to control the display screen to be switched on, or a switching-off signal configured to control the display screen to be switched off.

The master control circuit is configured to output the switching-on signal to a corresponding display screen when the switch control signal is switched from an invalid pulse signal to a valid pulse signal, and to output the switching-off signal to the corresponding display screen when the switch control signal is switched from the valid pulse signal to the invalid pulse signal.

For each of the plurality of switch control circuits, the switch control circuit is electrically connected to the master control circuit, configured to receive the display control voltage and the switch control signal corresponding to the corresponding display screen supply the display control voltage to the corresponding display screen under the control of the valid pulse signal of the received switch control signal, and drive the corresponding display screen to display according to the received display control voltage and the received data signal.

Optionally, in the embodiments of the present disclosure, the plurality of display switching instructions further include a touch starting signal configured to trigger touch functions of the display screen. The master control circuit is configured to simultaneously output the switching-on signal and the touch starting signal to the display screen.

Optionally, in the embodiments of the present disclosure, the display control voltage includes a plurality of sub-voltages with different functions. Each of the plurality of switch control circuits includes a plurality of switch transistors corresponding to the plurality of sub-voltages in the display control voltage one by one. For each of the plurality of switch transistors, a grid electrode of the switch transistor is configured to receive the corresponding switch control signal, a first electrode of the switch transistor is configured to receive the corresponding sub-voltage, and a second electrode of the switch transistor is configured to output the received sub-voltage to the corresponding display screen.

Optionally, in the embodiments of the present disclosure, the master control circuit includes a processor.

Optionally, in the embodiments of the present disclosure, the device further includes a channel analog switch, and a plurality of processor interfaces corresponding to the plurality of display screens one by one.

The master control circuit is connected to the channel analog switch, and the channel analog switch is respectively connected to the plurality of display screens via the plurality of processor interfaces.

The master control circuit is further configured to output a plurality of transmission control signals corresponding to the plurality of display screens one by one to the channel analog switch.

The channel analog switch is further configured to select a processor interface corresponding to a transmission control signal under the control of the received transmission control signal, and output the received data signal to the corresponding display screen via the selected processor interface.

Optionally, in the embodiments of the present disclosure, two display screens are provided, and the channel analog switch is a single-channel analog switch.

The embodiments of the present disclosure provide a control method of the above switching control device. The method includes the following operations.

Outputting, by a master control circuit, a display control voltage, and outputting, in a time-sharing manner, a plurality of display switching instructions corresponding to a plurality of display screens one by one, where for each of the plurality of display screens, the plurality of display switching instructions include at least one of a switch control signal configured to control the switch control circuit corresponding to the display screen, a data signal configured to control display frames of the display screen, a switching-on signal configured to control the display screen to be switched on, or a switching-off signal configured to control the display screen to be switched off.

Outputting, by the master control circuit, the switching-on signal to a corresponding display screen when the switch control signal is switched from an invalid pulse signal to a valid pulse signal, and outputting the switching-off signal to the corresponding display screen when the switch control signal is switched from the valid pulse signal to the invalid pulse signal.

For each of the plurality of switch control circuits, receiving, by the switch control circuit, the display control voltage and the switch control signal corresponding to the corresponding display screen, and supplying the display control voltage to the corresponding display screen under the control of the valid pulse signal of the received switch control signal, and driving the corresponding display screen to display according to the received display control voltage and the received data signal.

Optionally, in the embodiments of the present disclosure, the plurality of display switching instructions further include a touch starting signal configured to trigger touch functions of the display screen; and outputting, by the master control circuit, the switching-on signal to the corresponding display screen includes: simultaneously outputting, by the master control circuit, the switching-on signal and the touch starting signal to the display screen.

Optionally, in the embodiments of the present disclosure, the switching control device further includes a channel analog switch, and a plurality of processor interfaces corresponding to the plurality of display screens one by one. The control method further includes: outputting, by the master control circuit, a plurality of transmission control signals corresponding to the plurality of display screens one by one to the channel analog switch; and selecting, by the channel analog switch, a processor interface corresponding to a transmission control signal under the control of the received transmission control signal, and outputting the received data signal to the corresponding display screen via the selected processor interface.

The embodiments of the present disclosure provide a display device, including at least two display screens and the above switching control device.

Each display screen is configured to receive a display control voltage, and at least one of a data signal, a switching-on signals or a switching-off signal in corresponding display switching instructions; to be switched on under the control of the received switching-on signal; to display according to the display control voltage and the data signal; and to be switched off under the control of the received switching-off signal.

Optionally, in the embodiments of the present disclosure, initialization codes corresponding to the switching-on signal are pre-burnt in the display screen, and are configured to control the display screen to be switched on under calling of the switching-on signal.

Optionally, in the embodiments of the present disclosure, touch address codes corresponding to a touch starting signal are pre-burnt in the display screen, and are configured to trigger touch functions of the display screen under calling of the touch starting signal.

Optionally, in the embodiments of the present disclosure, the display device is a mobile phone.

DETAILED DESCRIPTION OF THE EMBODIMENTS

Figure 1:
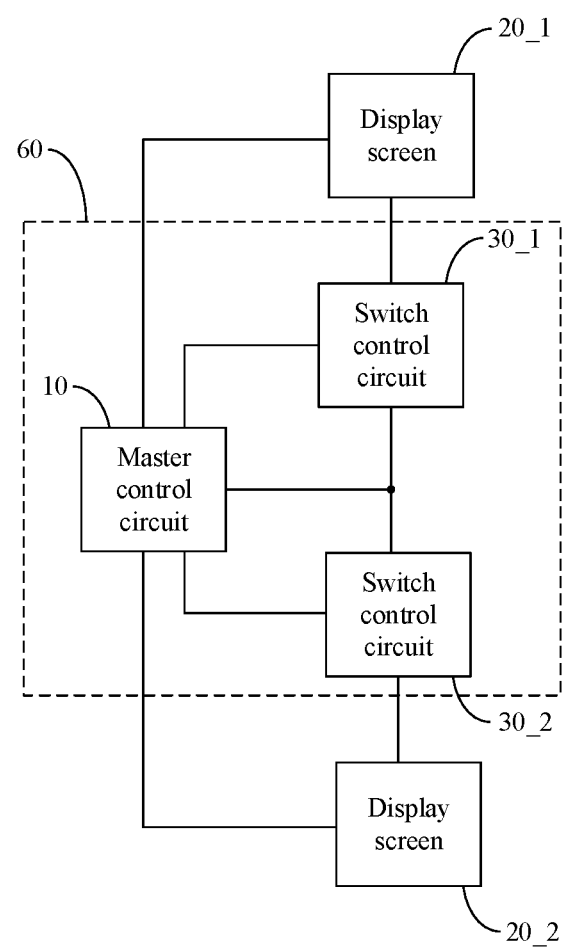
FIG. 1 is a structural schematic diagram of a switching control device provided by an embodiment of the present disclosure.

Generally, a display screen may include a liquid crystal display (LCD) and an active-matrix organic light emitting diode (AMOLED) display screen. At present, a display device for realizing double-sided display generally adopts the AMOLED display screen. In the AMOLED display screen, odd columns of pixels are made on an obverse side of the AMOLED display screen, even columns of pixels are made on a reverse side of the AMOLED display screen, and the pixels located in the same row and respectively located in the obverse side and the reverse side are connected to a same grid line. When the AMOLED display screen displays a frame, the pixels located in two sides of the AMOLED display screen and located in the same row are driven by adopting a same driving signal, so that an effect of obverse-side display or reverse-side display is realized.

However, the odd columns of pixels and the even columns of pixels of the AMOLED display screen are not located in the same plane to result in lower resolution ratio, so that the frame display quality is lowered.

When the LCD displays a frame, voltages with different functions are required, such as power voltages VSP and VSN configured to be input to the LCD and drive the LCD to be overturned, a power supply voltage IOVCC configured to be input to an integrated circuit (IC), a reset voltage RESET configured to be input to the LCD, a PWM voltage configured to be input to a backlight source of the LCD, and voltages TE and ATTN configured to be input to the LCD, etc. The voltages are similar to voltages in the related art, which is should be understood by those skilled in the art, and is not described herein.

At present, in order to increase the resolution ratio of display, display screens with high resolution ratios in the related art may be adopted, and a plurality of display screens are controlled via a processor to perform displaying in a time-sharing manner. Specifically, a processor is generally directly connected to the plurality of display screens, in this way, when displaying is performed on a certain display screen, the processor not only may output a display control voltage (such as VSP, VSN, IOVCC, RESET, PWM, TE, ATTN, etc) to the display screen, so as to make the display screen perform displaying, but also may simultaneously output the display control voltage to the remaining display screens. Therefore, the remaining display screens form an additional load of the processor, thereby resulting in higher power consumption of the processor.

Based on the above content, an embodiment of the present disclosure provides a switching control device by which a plurality of display screens may be controlled to realize displaying in a time-sharing manner, and the power consumption may be reduced without affecting the resolution ratio.

To make the objectives, technical solutions and advantages of the present disclosure clearer, specific implementations of a switching control device, a control method thereof and a display device provided by embodiments of the present disclosure are described in detail below in combination with accompanying drawings. It should be understood that the preferred embodiments described below are only intended to illustrate and explain the present disclosure, rather than to limit the present disclosure. Moreover, the embodiments in the present application and features in the embodiments may be combined with each other under the condition of no confliction. In addition, the size and shape of each figure in the accompanying drawings are only intended to explain the content of the present disclosure, rather than to reflect the true proportions of the switching control device, the control method thereof and the display device.

An embodiment of the present disclosure provides a switching control device capable of controlling a plurality of display screens to be switched on in a time-sharing manner. As shown in FIG. 1, the switching control device includes a master control circuit 10 and a plurality of switch control circuits 30_$m$ corresponding to a plurality of display screens 20_$m$ one by one, where m is an integer greater than or equal to 1 and smaller than or equal to M, and M is the sum of the display screens and is an integer greater than or equal to 2. FIG. 1 is described by taking M=2 as an example.

The master control circuit 10 is configured to output a display control voltage and output in a time-sharing manner, a plurality of display switching instructions corresponding to the plurality of display screens 20_$m$ one by one.

For each of the display screens 20_$m$, the plurality of display switching instructions include at least one of a switch control signal configured to control a switch control circuit 30_$m$ corresponding to the display screen 20_$m$, a data signal configured to control display frames of the display screen 20_$m$, a switching-on signal configured to control the display screen 20_$m$ to be switched on, or a switching-off signal configured to control the display screen 20_$m$ to be switched off.

The master control circuit is configured to output the switching-on signal to the corresponding display screen 20_$m$ when the switch control signal is switched from an invalid pulse signal to a valid pulse signal and to output the switching-off signal to the corresponding display screen 20_$m$ when the switch control signal is switched from the valid pulse signal to the invalid pulse signal.

For each of the plurality of switch control circuits 30_$m$, the switch control circuit 30_$m$ is electrically connected to the master control circuit, configured to receive the display control voltage and the switch control signal corresponding to the corresponding display screen 20_$m$, supply the display control voltage to the corresponding display screen 20_$m$ under the control of the valid pulse signal of the received switch control signal so as to drive the corresponding display screen 20_$m$ to perform displaying according to the received display control voltage and the received data signal.

According to the switching control device provided by the embodiments of the present disclosure, the display switching instructions corresponding to the display screens one by one are output in a time-sharing manner via the master control circuit, the data signal configured for displaying, the switching-on signal configured to control the display screen to be switched on, and the switching-off signal configured to control the display screen to be switched off may be output to one display screen within a period of time, and the switch control signal is further output to the switch control circuit corresponding to the display screen within the same period of time, so that the switch control circuit is controlled to only input the display control voltage uniformly output by the master control circuit to the display screen and to selectively input the display control voltage to the display screen, and therefore, the voltage is provided when the display screen is switched on and the display screen displays a frame. The master control circuit in the embodiment of the present disclosure may control the display screen to perform displaying in a time-sharing manner under the condition that the resolution ratio is not reduced, and moreover, the display screen not performing displaying may avoid receiving the display control voltage, so that the power consumption of the master control circuit may be reduced.

In some embodiments, the display screens may be LCDs or AMOLEDs. When the display screens are the LCDs, the display control voltage may include a plurality of sub-voltages with different functions, and the sub-voltages may be VSP, VSN, IOVCC, RESET, PWM, TE and ATTN. When the display screens are the AMOLEDs, the display control voltage may include a plurality of sub-voltages with different functions, and the sub-voltages may be, for example, high-level power voltages VDD, low-level power voltages VSS and IOVCC, etc., input to the AMOLEDs. The display screens being the LCDs and the sub-voltages being VSP, VSN, IOVCC, RESET, PWM, TE and ATTN are taken as examples for illustration below, but a reader should know that the voltages are not limited herein. Moreover, in the embodiment of the present disclosure, the LCDs may include liquid crystal display panels and backlight modules.

Generally, the display screens may realize touch functions, in some embodiments, for each display screen, the display switching instructions may include a touch starting signal configured to trigger touch function of the display screen. The master control circuit is configured to simultaneously output the switching-on signal and the touch starting signal to the display screen. In this way, the display screen may be controlled to start the touch functions while the master control circuit controls the display screen to be switched on.

Figure 2:
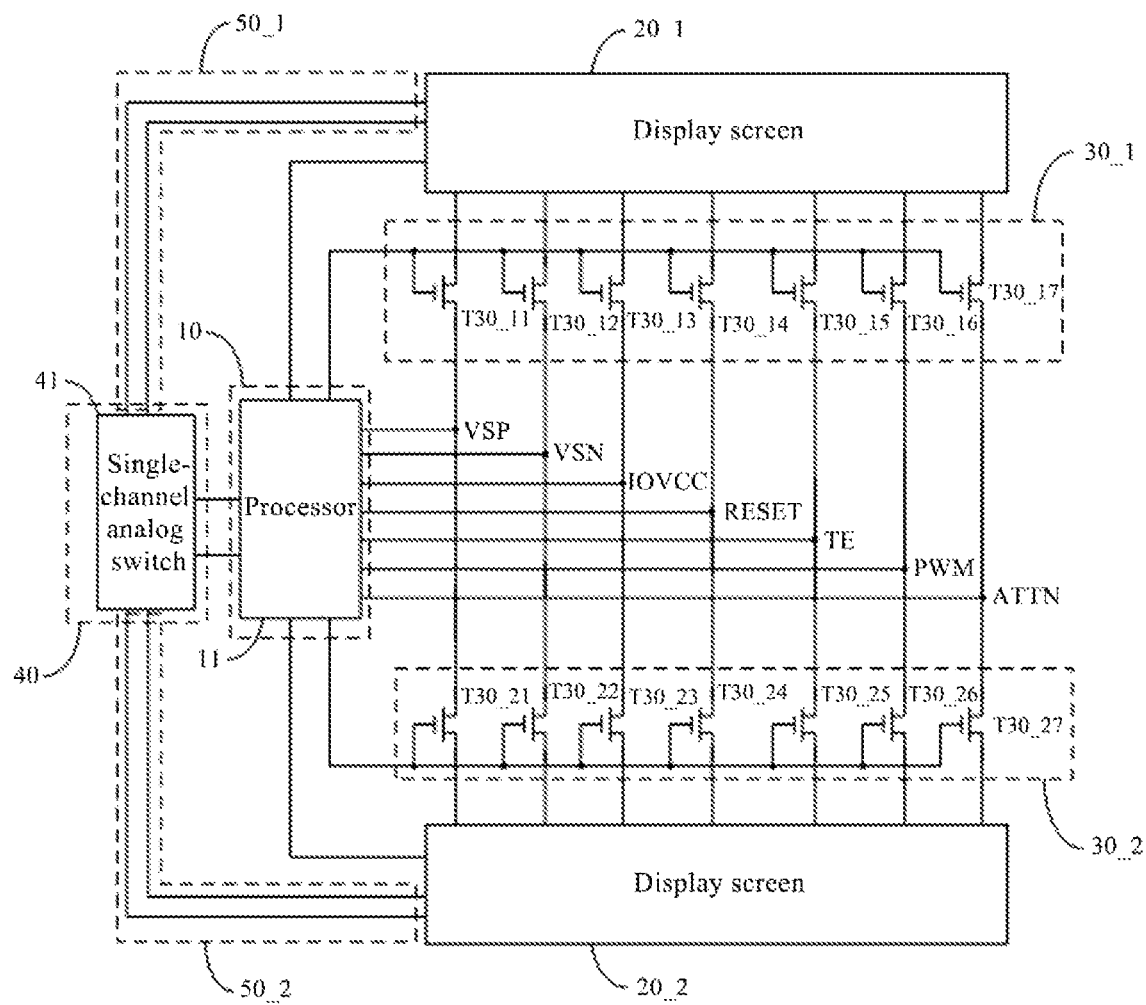
FIG. 2 is a specific structural schematic diagram of the switching control device provided by the embodiment of the present disclosure.

In some embodiments, as shown in FIG. 2, the switching control device further includes a channel analog switch 40 and a plurality of processor interfaces 50_$m$ corresponding to the plurality of display screens 20_$m$ one by one. The processor interfaces may be mobile industry processor interfaces (MIPIs) which may realize transmission of differential signals and increase the transmission rate of the signals.

The master control circuit 10 is connected to the channel analog switch 40. The channel analog switch 40 is respectively connected to the display screens 20_$m$ via the processor interfaces 50_$m$. The master control circuit 10 transmits a data signal to the corresponding display screen 20_$m$ via the channel analog switch 40 and an MIPI 50_$m$ corresponding to the display screen 20_$m$.

The master control circuit 10 is further configured to output transmission control signals corresponding to the display screens 20_$m$ one by one to the channel analog switch 40.

The channel analog switch 40 is configured to select MIPIs corresponding to the transmission control signals under the control of the received transmission control signals and output the received data signals to the corresponding display screens via the selected MIPIs. The transmission control signals may include enabling signals and transmission starting signals corresponding to the corresponding display screens one by one. The enabling signals and the transmission starting signals may be data signals, and are designed and determined according to an actual application environment, which is not limited herein.

In actual application, generally, the data signals output by the master control circuit may include five pairs of differential signals. Therefore, during specific implementation, five channel analog switches may be provided, and five MIPIs corresponding to the display screens one by one are also provided. One channel analog switch is correspondingly connected to M number of MIPIs, and the M MIPIs connected to the same channel analog switch are respectively connected to the different display screens.

In some embodiments, two display screens may be provided, in this way, one channel analog switch may be connected to two MIPIs, and then, the channel analog switch may be a single-channel analog switch 41. As shown in FIG. 2, an embodiment that one single-channel analog switch 41 corresponds to two MIPIs is shown. Moreover, enabling signals corresponding to a display screen 20_1 and a display screen 20_2 may be digital signals represented by "1", a transmission starting signal corresponding to the display screen 20_1 may be a digital signal represented by "0", and the transmission starting signal corresponding to the display screen 20_2 may be a digital signal represented by "1".

In some embodiments, as shown in FIG. 2, the master control circuit 10 may include one or more processors. The processor may adopt a software and hardware combination manner so as to realize the above-mentioned functions. Moreover, a structure of the processor may be same as a structure in the related art, which is not described herein.

In some embodiments, the display control voltage includes a plurality of sub-voltages with different functions. In one embodment, the display control voltage includes seven sub-voltages with different functions, namely VSP, VSN, IOVCC, RESET, PWM, TE and ATTN.

In the embodiments of the present disclosure, as shown in FIG. 2, each switch control circuit 30_m includes switch transistors T30_*mn* (n is an integer greater than or equal to 1 and smaller than or equal to N, and N is the sum of the sub-voltages included in the display control voltage) corresponding to the sub-voltages in the display control voltage. Grid electrodes of the switch transistors T30_*mn* are connected to the processor 11 and are configured to receive the corresponding switch control signals, first electrodes of the switch transistors T30_*mn* are connected to the processor 11 and are configured to receive the corresponding sub-voltages, and second electrodes of the switch transistors T30_*mn* are connected to the corresponding display screens 20_m and are configured to output the received sub-voltages to the corresponding display screens 20_m.

In some embodiments, N-type transistors are turned on under the control of high-level signals and are turned off under the control of low-level signals. P-type transistors are turned on under the control of the low-level signals and are turned off under the control of the high-level signals.

In some embodiments, as shown in FIG. 2, the switch transistors T30_*mn* may be the N-type transistors. Moreover, valid pulse signals of the switch control signals are the high-level signals, and invalid level signals of the switch control signals are the low-level signals. When rising edges appear in the switch control signals, the processor outputs the switching-on signals to the corresponding display screens; and when falling edges appear in the switch control signals, the processor outputs the switching-off signals to the corresponding display screens.

In some embodiments, two display screens are taken as examples. The specific implementation of the switch control signals may be as shown in FIG. 3.

Figure 3:
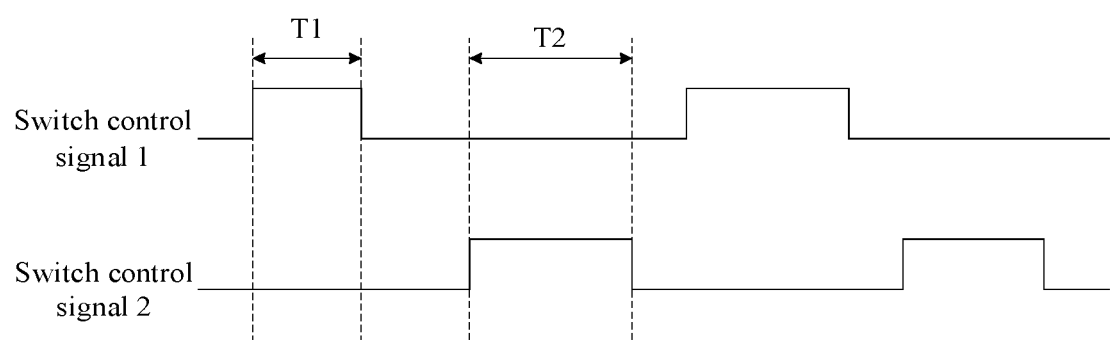
FIG. 3 is a sequence diagram of switch control signals provided by an embodiment of the present disclosure.

In FIG. 3, a switch control signal 1 is further expressed as Driven representing for a switch control signal corresponding to a display screen 20_1, and a switch control signal 2 is further expressed as Driver2 representing for a switch control signal corresponding to a display screen 20_2. High-level signals in Driver1 and Driver2 appear in a time-sharing manner, namely after Driver1 is switched from a high-level signal to a low-level signal, after a first preset duration, Driver2 is switched from the low-level signal to the high-level signal. Similarly, after Driver2 is switched from the high-level signal to the low-level signal, after a second preset duration, Driven is switched from the low-level signal to the high-level signal. In this way, the display screen 20_1 and the display screen 20_2 may realize switching on and displaying in a time-sharing time. Moreover, the first preset duration and the second preset duration are required to be designed and determined according to an actual application environment, which is not limited herein.

Of course, the switch transistors may also be the P-type transistors. Moreover, valid pulse signals of the switch control signals are low-level signals, and invalid level signals of the switch control signals are high-level signals. At the moment, when falling edges appear in the switch control signals, the processor outputs the switching-on signals to the corresponding display screens; and when rising edges appear in the switch control signals, the processor outputs the switching-off signals to the corresponding display screens.

Based on the same inventive concept, an embodiment of the present disclosure further provides a control method of the above-mentioned switching control device.

Figure 4:
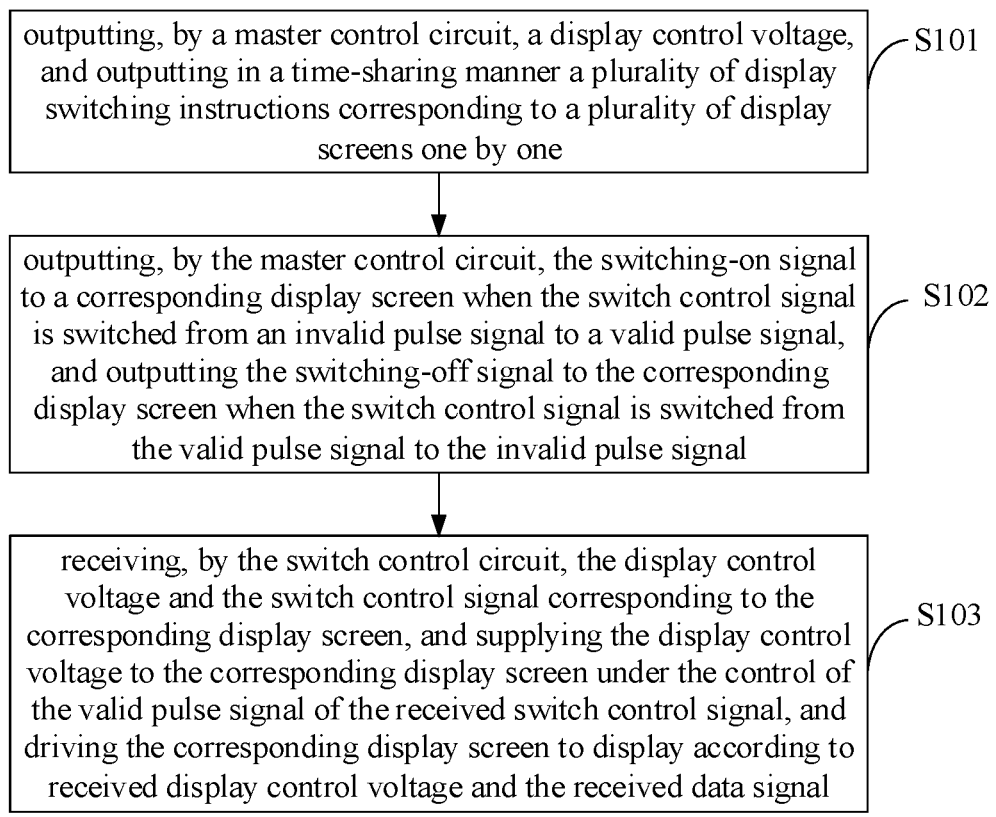
FIG. 4 is a flow diagram of a control method of the above-mentioned switching control device provided by the embodiment of the present disclosure.

As shown in FIG. 4, the control method includes the following operations.

S101, a master control circuit outputs a display control voltage and outputs in a time-sharing manner, a plurality of display switching instructions corresponding to a plurality of display screens one by one. For each of the plurality of the display screens, the plurality of display switching instructions include at least one of a switch control signal configured to control switch control circuit corresponding to the display screen, a data signal configured to control display frames of the display screen, a switching-on signal configured to control the display screen to be switched on, or a switching-off signal configured to control the display screens to be switched off.

S102, the master control circuit outputs the switching-on signal to a corresponding display screen when the switch control signal is switched from an invalid pulse signal to a valid pulse signal, and outputs the switching-off signal to the corresponding display screen when the switch control signal is switched from the valid pulse signal to the invalid pulse signal.

S103, for each of the plurality of switch control circuits, the switch control circuit receives the display control voltage and the switch control signal corresponding to the corresponding display screen, and supplies the display control voltage to the corresponding display screen under the control of the valid pulse signal of the received switch control signal so as to drive the corresponding display screen to perform displaying according to the received display control voltage and the received data signal.

In the above-mentioned control method provided by the embodiment of the present disclosure, the display switching instructions corresponding to the display screens one by one are output in a time-sharing manner via the master control circuit, the data signal, the switching-on signal and the switching-off signal may be output to one display screen within a period of time, and the switch control signal is further output to the switch control circuit corresponding to the display screen within the same period of time, so that the switch control circuit is controlled to input the display control voltage uniformly output by the master control circuit to the display screen only and to selectively input the display control voltage to the display screen, and therefore, the voltage is provided when the display screen is switched on and the display screen displays a frame. Therefore, the display screen may be controlled to perform displaying in a time-sharing manner under the condition that the resolution ratio is not reduced, and moreover, the display screen not performing displaying may avoid receiving the display control voltage, so that the power consumption of the master control circuit may be reduced.

It should be noted that symbols S101-S103 in the steps in FIG. 4 are only intended to distinguish each step, rather than to limit the order of the steps.

In some embodiments, the display screens may have touch functions, the above-mentioned display switching instructions further include one or more touch starting signals configured to trigger the touch functions of the display screens.

The step that the master control circuit outputs the switching-on signal to the corresponding display screen includes that: the master control circuit simultaneously outputs the switching-on signal and the touch starting signal to the display screen.

In this way, the master control circuit may control the display screen to start the touch functions while controlling the display screen to be switched on.

Further, in the above-mentioned control method provided by the embodiment of the present disclosure, the switching control device further includes a channel analog switch, and a plurality of processor interfaces corresponding to the plurality of display screens one by one.

The control method further includes the following operations.

The master control circuit outputs a plurality of transmission control signals corresponding to the plurality of display screens one by one to the channel analog switch.

The channel analog switch selects a processor interface corresponding to a transmission control signal under the control of the received transmission control signal and outputs the received data signal to the corresponding display screens via the selected processor interface.

In this way, the master control circuit may output the data signal to the corresponding display screen via the channel analog switch and the MIPI corresponding to the display screen.

Based on the same inventive concept, an embodiment of the present disclosure further provides a display device, as shown in FIG. 1, including a plurality of display screens 20_m and a switching control device 60 provided by the embodiments of the present disclosure.

Each of the display screens 20_m is configured to receive a data signal, a switching-on signal and a switching-off signal in a corresponding display switching instruction and a display control voltage, is switched on under the control of the received switching-on signal, performs displaying according to the display control voltage and the data signal, and is switched off under the control of the received switching-off signal.

Generally, some programs, address codes or voltages, etc., pre-stored in driving ICs in the display screens are required to be called when the display screens are switched on. In the embodiments of the present disclosure, initialization codes corresponding to the switching-on signal are pre-burnt in each of the display screens and are configured to control the display screen to be switched off under the calling of the switching-on signal. The initialization codes may be same as initialization codes in the related art, which should be understood by those skilled in the art, and is not described herein.

Generally, some programs, address codes or voltages, etc., pre-stored in the display screens are required to be called when the touch functions of the display screens are started. In the embodiments of the present disclosure, touch address codes corresponding to a touch starting signal are also pre-burnt in each of the display screens and are configured to trigger the touch functions of the display screen under the calling of the touch starting signal. Specifically, in order to avoid a triggering error of the touch functions, the touch address codes corresponding to one display screen are unique. In some embodiments, the touch starting signal may be pre-burnt into the corresponding display screen by adopting an I2C protocol address.

In some embodiments, the display device provided by the embodiment of the present disclosure may be a mobile phone. Of course, the display device may also be a tablet personal computer, a television, a display, a notebook computer, a digital photo frame, a navigator or any product or component with a display function. Ordinary those skilled in the art should understand the existence of other essential components of the display device, which is not described herein and does not limit the present disclosure.

When the display device is the mobile phone, the mobile phone may be a flip phone. An outer side of the flip phone is the display screen 20_1, and an inner side of the flip phone is the display screen 20_2. When the flip phone is closed, the display screen 20_1 may be controlled to be switched on and perform displaying, and the display screen 20_2 may be controlled to be switched off. When the flip phone is opened, the display screen 20_1 may be controlled to be switched off, and the display screen 20_2 may be controlled to be switched on and perform displaying.

The working manners of the embodiments of the present disclosure may be described below by taking a structure as shown in FIG. 2 and a sequence diagram as shown in FIG. 3 as examples. A reader should know that the working manners of the embodiments of the present disclosure are not limited herein.

During a stage T1, a switch control signal 2 (Driver2) controls switch transistors T30_21 to T30_27 to be turned off. A switch control signal 1 (Driver1) controls switch transistors T30_11 to T30_17 to be turned on, so that received sub-voltages VSP, VSN, IOVCC, RESET, PWM, TE and ATTN are supplied to a display screen 20_1. When a rising edge appears in the switch control signal Driver1, a processor 10 outputs a switching-on signal to the display screen 20_1, and an initialization code pre-burnt in the display screen 20_1 is called via the switching-on signal, so that the display screen 20_1 is controlled to be switched on according to each of the received sub-voltages. Moreover, a processor 11 further inputs an enabling signal with an "1" level and a transmission starting signal with a "0" level to a single-channel analog switch 41 to control the single-channel analog switch 41 to select an MIPI 50_1, and provides a data signal configured for displaying to the display screen 20_1, so that the display screen 20_1 realizes a frame display function under the control of the received sub-voltages VSP, VSN, IOVCC, RESET, PWM, TE and ATTN, and a data signal. When a falling edge appears in the switch control signal Driver1, the processor 10 outputs a switching-off signal to the display screen 20_1 to control the display screen 20_1 to be switched off. Moreover, the switch control signal Driver1 controls the switch transistors T30_11 to T30_17 to be turned off, so that inputting the sub-voltages to the display screen 20_1 is stopped.

During a stage T2, the switch control signal 1 (Driver1) controls the switch transistors T30_11 to T30_17 to be turned off. The switch control signal 2 (Driver2) controls the switch transistors T30_21 to T30_27 to be turned on, so that the received sub-voltages VSP, VSN, IOVCC, RESET, PWM, TE and ATTN are supplied to the display screen 20_2. When the rising edge appears in the switch control signal Driver2, the processor 10 outputs the switching-on signal to the display screen 20_2, and the initialization code pre-burnt in the display screen 20_2 is called via the switching-on signal, so that the display screen 20_2 is controlled to be switched on according to each of the received sub-voltages. Moreover, the processor 11 further inputs the enabling signal with an "1" level and the transmission starting signal with a "1" level to the single-channel analog switch 41 to control the single-channel analog switch 41 to select an MIPI 50_2, and provides the data signal configured for displaying to the display screen 20_2, so that the display screen 20_2 realizes a frame display function under the control of the received sub-voltages VSP, VSN, IOVCC, RESET, PWM, TE and ATTN, and the data signal. When the falling edge appears in the switch control signal Driver2, the processor 10 outputs the switching-off signal to the display screen 20_2 to control the display screen 20_2 to be switched off. Moreover, the switch control signal Driver2 controls the switch transistors T30_21 to T30_27 to be turned off, so that inputting the sub-voltages to the display screen 20_2 is stopped.

Moreover, the above-mentioned working processes may be repeated after the stage T2. Of course, before the stage T2, a plurality of stages T1 may be set to control the display screen 20_1 to be switched on and perform displaying for multiple times. Similarly, before the stage T1, a plurality of stages T2 may be set to control the display screen 20_2 to be switched on and perform displaying for multiple times. There are no limitations herein.

According to the switching control device, the control method thereof and the display device provided by the embodiments of the present disclosure, the display switching instructions corresponding to the display screens one by one are output in a time-sharing manner via the master control circuit, the data signal configured for displaying, the switching-on signal configured to control the display screen to be switched on, and the switching-off signal configured to control the display screen to be switched off may be output to one display screen within a period of time, and the switch control signal is further output to the switch control circuit corresponding to the display screen within the same period of time, so that the switch control circuit is controlled to input the display control voltage uniformly output by the master control circuit to the display screen only and to selectively input the display control voltage to the display screen, and therefore, the voltage is provided only when the display screen is switched on and the display screen displays a frame. The master control circuit in the embodiment of the present disclosure may control the display screen to perform displaying in a time-sharing manner, moreover, the display screen not performing displaying may avoid receiving the display control voltage, so that the power consumption of the master control circuit may be reduced.

Although the preferred embodiments of the present disclosure have been described, those skilled in the art can make additional alterations and modifications on the embodiments once they know the basic creative concept. Therefore, the appended claims are intended to be interpreted to include the preferred embodiments and all the alterations and modifications falling within the scope of the present disclosure.

Obviously, those skilled in the art can make various alterations and variations on the embodiments of the present disclosure without departing from the spirit and scope of the present disclosure. In this way, if the alterations and variations of the embodiments of the present disclosure fall within the scopes of the claims and the equivalent technologies of the present disclosure, the present disclosure is also intended to include the alterations and variations.

The invention claimed is:

1. A switching control device, comprising:
 a master control circuit; and
 a plurality of switch control circuits corresponding to a plurality of display screens one by one;
 wherein the master control circuit is configured to output a display control voltage, and output, in a time-sharing manner, a plurality of display switching instructions corresponding to the plurality of display screens one by one;
 wherein for each of the plurality of display screens, the plurality of display switching instructions comprise at least one of a switch control signal configured to control the switch control circuit corresponding to the display screen, a data signal configured to control display frames of the display screen, a switching-on signal configured to control the display screen to be switched on, or a switching-off signal configured to control the display screen to be switched off;
 wherein the master control circuit is configured to output the switching-on signal to a corresponding display screen when the switch control signal is switched from an invalid pulse signal to a valid pulse signal, and to output the switching-off signal to the corresponding display screen when the switch control signal is switched from the valid pulse signal to the invalid pulse signal; and
 wherein for each of the plurality of switch control circuits, the switch control circuit is electrically connected to the master control circuit, configured to receive the display control voltage and the switch control signal corresponding to the corresponding display screen supply the display control voltage to the corresponding display screen under the control of the valid pulse signal of the received switch control signal, and drive the corresponding display screen to display according to the received display control voltage and the received data signal;
 wherein the display control voltage comprises a plurality of sub-voltages with different functions;
 each of the plurality of switch control circuits comprises a plurality of switch transistors corresponding to the plurality of sub-voltages in the display control voltage one by one; and
 for each of the plurality of switch transistors, a grid electrode of the switch transistor is configured to receive the corresponding switch control signal, a first electrode of the switch transistor is configured to receive the corresponding sub-voltage, and a second electrode of the switch transistor is configured to output the received sub-voltage to the corresponding display screen.

2. The switching control device according to claim 1, wherein the plurality of display switching instructions further comprise a touch starting signal configured to trigger touch functions of the display screen; and
 the master control circuit is configured to simultaneously output the switching-on signal and the touch starting signal to the display screen.

3. The switching control device according to claim 1, wherein the master control circuit comprises a processor.

4. The switching control device according to claim 1, further comprising: a channel analog switch, and a plurality of processor interfaces corresponding to the plurality of display screens one by one;
 wherein the master control circuit is connected to the channel analog switch, and the channel analog switch is respectively connected to the plurality of display screens via the plurality of processor interfaces;

wherein the master control circuit is further configured to output a plurality of transmission control signals corresponding to the plurality of display screens one by one to the channel analog switch; and wherein the channel analog switch is further configured to select a processor interface corresponding to a transmission control signal under the control of the received transmission control signal, and output the received data signal to the corresponding display screen via the selected processor interface.

5. The switching control device according to claim 4, wherein two display screens are provided, and the channel analog switch is a single-channel analog switch.

6. A control method of the switching control device according to claim 1, comprising:

outputting, by a master control circuit, a display control voltage, and outputting, in a time-sharing manner, a plurality of display switching instructions corresponding to a plurality of display screens one by one, wherein for each of the plurality of display screens, the plurality of display switching instructions comprise at least one of a switch control signal configured to control the switch control circuit corresponding to the display screen, a data signal configured to control display frames of the display screen, a switching-on signal configured to control the display screen to be switched on, or a switching-off signal configured to control the display screen to be switched off;

outputting, by the master control circuit, the switching-on signal to a corresponding display screen when the switch control signal is switched from an invalid pulse signal to a valid pulse signal, and outputting the switching-off signal to the corresponding display screen when the switch control signal is switched from the valid pulse signal to the invalid pulse signal; and for each of the plurality of switch control circuits, receiving, by the switch control circuit, the display control voltage and the switch control signal corresponding to the corresponding display screen, and supplying the display control voltage to the corresponding display screen under the control of the valid pulse signal of the received switch control signal, and driving the corresponding display screen to display according to the received display control voltage and the received data signal.

7. The control method according to claim 6, wherein the plurality of display switching instructions further comprise a touch starting signal configured to trigger touch functions of the display screen; and outputting, by the master control circuit, the switching-on signal to the corresponding display screen comprises:

simultaneously outputting, by the master control circuit, the switching-on signal and the touch starting signal to the display screen.

8. The control method according to claim 6, wherein the switching control device further comprises a channel analog switch, and a plurality of processor interfaces corresponding to the plurality of display screens one by one;

the control method further comprises:

outputting, by the master control circuit, a plurality of transmission control signals corresponding to the plurality of display screens one by one to the channel analog switch; and selecting, by the channel analog switch, a processor interface corresponding to a transmission control signal under the control of the received transmission control signal, and outputting the received data signal to the corresponding display screen via the selected processor interface.

9. A display device, comprising at least two display screens and the switching control device according to claim 1; and each display screen is configured to receive a display control voltage, and at least one of a data signal, a switching-on signals or a switching-off signal in corresponding display switching instructions; to be switched on under the control of the received switching-on signal; to display according to the display control voltage and the data signal; and to be switched off under the control of the received switching-off signal.

10. The display device according to claim 9, wherein initialization codes corresponding to the switching-on signal are pre-burnt in the display screen, and are configured to control the display screen to be switched on under calling of the switching-on signal.

11. The display device according to claim 10, wherein touch address codes corresponding to a touch starting signal are pre-burnt in the display screen, and are configured to trigger touch functions of the display screen under calling of the touch starting signal.

12. The display device according to claim 9, wherein the display device is a mobile phone.

13. A switching control device, comprising:

a master control circuit; and a plurality of switch control circuits corresponding to a plurality of display screens one by one;

wherein the master control circuit is configured to output a display control voltage, and output, in a time-sharing manner, a plurality of display switching instructions corresponding to the plurality of display screens one by one;

wherein for each of the plurality of display screens, the plurality of display switching instructions comprise at least one of a switch control signal configured to control the switch control circuit corresponding to the display screen, a data signal configured to control display frames of the display screen, a switching-on signal configured to control the display screen to be switched on, or a switching-off signal configured to control the display screen to be switched off;

wherein the master control circuit is configured to output the switching-on signal to a corresponding display screen when the switch control signal is switched from an invalid pulse signal to a valid pulse signal, and to output the switching-off signal to the corresponding display screen when the switch control signal is switched from the valid pulse signal to the invalid pulse signal; and wherein for each of the plurality of switch control circuits, the switch control circuit is electrically connected to the master control circuit, configured to receive the display control voltage and the switch control signal corresponding to the corresponding display screen supply the display control voltage to the corresponding display screen under the control of the valid pulse signal of the received switch control signal, and drive the corresponding display screen to display according to the received display control voltage and the received data signal;

wherein the switching control device further comprises: a channel analog switch, and a plurality of processor interfaces corresponding to the plurality of display screens one by one;

wherein the master control circuit is connected to the channel analog switch, and the channel analog switch is respectively connected to the plurality of display screens via the plurality of processor interfaces;

wherein the master control circuit is further configured to output a plurality of transmission control signals corresponding to the plurality of display screens one by one to the channel analog switch;

wherein the channel analog switch is further configured to select a processor interface corresponding to a transmission control signal under the control of the received transmission control signal, and output the received data signal to the corresponding display screen via the selected processor interface; and wherein the display control voltage comprises a plurality of sub-voltages with different functions;

each of the plurality of switch control circuits comprises a plurality of switch transistors corresponding to the plurality of sub-voltages in the display control voltage one by one; and for each of the plurality of switch transistors, a grid electrode of the switch transistor is configured to receive the corresponding switch control signal, a first electrode of the switch transistor is configured to receive the corresponding sub-voltage, and a second electrode of the switch transistor is configured to output the received sub-voltage to the corresponding display screen.

14. The switching control device according to claim 13, wherein the plurality of display switching instructions further comprise a touch starting signal configured to trigger touch functions of the display screen; and the master control circuit is configured to simultaneously output the switching-on signal and the touch starting signal to the display screen.

15. The switching control device according to claim 13, wherein two display screens are provided, and the channel analog switch is a single-channel analog switch.

16. A switching control device, comprising:
a master control circuit; and
a plurality of switch control circuits corresponding to a plurality of display screens one by one;

wherein the master control circuit is configured to output a display control voltage, and output, in a time-sharing manner, a plurality of display switching instructions corresponding to the plurality of display screens one by one;

wherein for each of the plurality of display screens, the plurality of display switching instructions comprise at least one of a switch control signal configured to control the switch control circuit corresponding to the display screen, a data signal configured to control display frames of the display screen, a switching-on signal configured to control the display screen to be switched on, or a switching-off signal configured to control the display screen to be switched off;

wherein the master control circuit is configured to output the switching-on signal to a corresponding display screen when the switch control signal is switched from an invalid pulse signal to a valid pulse signal, and to output the switching-off signal to the corresponding display screen when the switch control signal is switched from the valid pulse signal to the invalid pulse signal; and wherein for each of the plurality of switch control circuits, the switch control circuit is electrically connected to the master control circuit, configured to receive the display control voltage and the switch control signal corresponding to the corresponding display screen supply the display control voltage to the corresponding display screen under the control of the valid pulse signal of the received switch control signal, and drive the corresponding display screen to display according to the received display control voltage and the received data signal;

wherein the plurality of display switching instructions further comprise a touch starting signal configured to trigger touch functions of the display screen; and the master control circuit is configured to simultaneously output the switching-on signal and the touch starting signal to the display screen; and wherein the display control voltage comprises a plurality of sub-voltages with different functions;

each of the plurality of switch control circuits comprises a plurality of switch transistors corresponding to the plurality of sub-voltages in the display control voltage one by one; and for each of the plurality of switch transistors, a grid electrode of the switch transistor is configured to receive the corresponding switch control signal, a first electrode of the switch transistor is configured to receive the corresponding sub-voltage, and a second electrode of the switch transistor is configured to output the received sub-voltage to the corresponding display screen.

17. The switching control device according to claim 16, further comprising: a channel analog switch, and a plurality of processor interfaces corresponding to the plurality of display screens one by one;

wherein the master control circuit is connected to the channel analog switch, and the channel analog switch is respectively connected to the plurality of display screens via the plurality of processor interfaces;

wherein the master control circuit is further configured to output a plurality of transmission control signals corresponding to the plurality of display screens one by one to the channel analog switch; and wherein the channel analog switch is further configured to select a processor interface corresponding to a transmission control signal under the control of the received transmission control signal, and output the received data signal to the corresponding display screen via the selected processor interface.

18. The switching control device according to claim 17, wherein two display screens are provided, and the channel analog switch is a single-channel analog switch.

* * * * *